F. SEITZ.
TOOL HOLDER.
APPLICATION FILED FEB. 21, 1911.
1,017,112.
Patented Feb. 13, 1912.
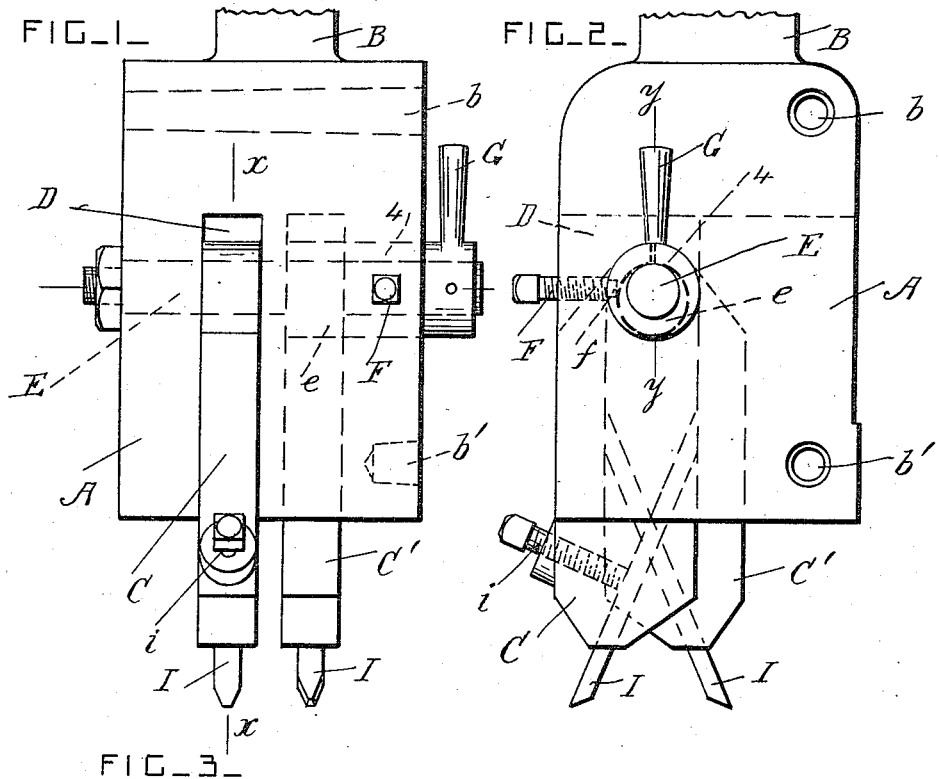
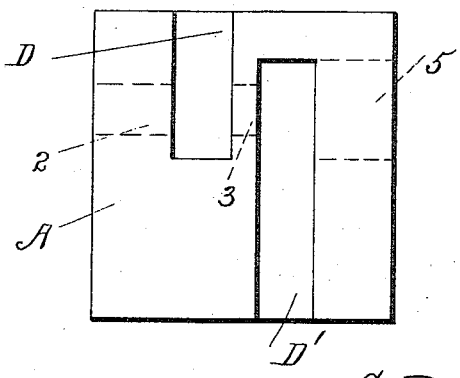
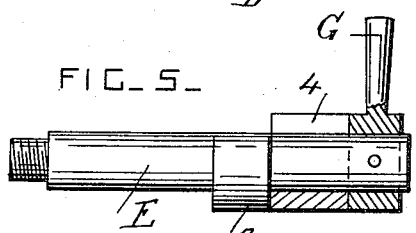
Witnesses
Inventor
Frederick Seitz.
By Herbert W. Jenner.
Attorney

UNITED STATES PATENT OFFICE.

FREDERICK SEITZ, OF RENSSELAER, NEW YORK.

TOOL-HOLDER.

1,017,112.  Specification of Letters Patent.  Patented Feb. 13, 1912.

Application filed February 21, 1911. Serial No. 610,099.

*To all whom it may concern:*

Be it known that I, FREDERICK SEITZ, a citizen of the United States, residing at Rensselaer, in the county of Rensselaer and State of New York, have invented certain new and useful Improvements in Tool-Holders; and I do hereby declare the following to be a full, clear, and exact description of the invention, such as will enable others skilled in the art to which it appertains to make and use the same.

This invention relates to tool holders or tool heads provided with oscillating double cutters; and it consists in the novel construction and combination of the parts hereinafter fully described and claimed.

In the drawings, Figure 1 is a front view of a tool holder constructed according to this invention. Fig. 2 is a side view of the tool holder. Fig. 3 is a plan view of the housing, from below. Fig. 4 is a vertical section through one of the tool blocks, taken on the line $x$—$x$ in Fig. 1. Fig. 5 is a cross-section taken on the line $y$—$y$ in Fig. 2 and showing the shaft and eccentric.

A is the housing or support which is formed of a rectangular block of metal provided with a shank B of any approved form for connecting the block with any suitable reciprocating machine tool. The housing has also a tapered hole $b$ for connecting it to the usual tapered pin which pivots the usual tool apron to the tool head of a planing machine, and $b'$ is a hole for a locking pin so that the housing may be secured to the said tool head in place of the usual tool apron and be prevented from oscillating. Any other approved means may however be used for securing the housing to any suitable machine tool.

C C' are two similar tool blocks which are arranged to work in two slots D D' in the housing. These slots are arranged parallel to each other, and they have openings upon opposite faces of the block and also at its lower end. The slot D' for the return tool is deeper than the slot D.

E is a shaft provided with an eccentric $e$ for moving one of the tool-blocks vertically in the housing without moving the other tool-block. The housing has bearings 2 and 3 of the same diameter, and one end portion of the shaft E is journaled in these bearings. The housing has also a split bush 4 which is inserted in a hole 5 in line with the bearings 2 and 3, and the other end portion of the shaft E is journaled in this bush. This bush affords a means for placing the eccentric $e$ in the slot D', and it also affords a means for clamping the shaft E to the housing, when required.

F is a locking screw which is screwed into the housing, and which has a projection $f$ which engages with a hole in the bush 4. This projection prevents the bush from revolving or sliding, and when the screw is screwed against the bush it contracts it so that it clamps the shaft.

G is an operating handle secured on one end portion of the shaft E. The tool blocks C C' are pivoted on the shaft E, and on its eccentric $e$, respectively, the block C' having a larger hole than the block C and being mounted on the eccentric. The lower end portions of these tool blocks project below the bottom of the housing. Each tool block has a hole H which is arranged at an acute angle to the vertical, and I is a planing or cutting tool secured in each hole H by means of a set-screw $i$. The opposite faces of the tool blocks bear against the bottoms of the slots in the housing, and the tool holes H are arranged crosswise of each other as shown in Fig. 2, one tool being arranged to cut in one direction, and the other tool being arranged to cut in the reverse direction. The eccentric which preferably supports the return cutting tool, can be turned by hand to adjust the point of the return cutting tool with reference to the point of the other tool which makes the forward cut.

The slot D' which is nearest the tool-head and crossbar of the planing machine is made deeper than the slot D, and the tool blocks C are mounted on a single axis, so that the points of the tools I may be relatively near together and both of them sufficiently distant from the tool-head and crossbar. When constructed in this manner both tool points can be seen easily while the machine is at work, and the attendant does not have to place his head in a dangerous position with respect to the machine in order to see both of them. One tool also does not have to be run to an undesirable distance beyond the end of the work to bring the other tool into action when the machine reverses. The eccentric enables the two cuts to be equalized without unclamping either tool, or one tool can be made to cut deeper than the other, if desired.

What I claim is:

1. In a tool holder, the combination, with a housing provided with slots having openings at its opposite faces, of a shaft journaled in the housing and projecting crosswise through its slots, said shaft being provided with an eccentric arranged in one of the slots, and two tool blocks pivoted in the said slots on the said shaft and its eccentric respectively, and bearing against the housing in opposite directions, said tool blocks being provided with means for holding cutting tools in position.

2. In a tool holder, the combination, with a housing provided with slots having openings at its opposite faces and provided also with shaft bearings, of a split bush arranged in the housing in line with the shaft bearings, a shaft journaled in the said bearings and provided with an eccentric arranged in one of the said slots, a screw for contracting the said split bush on the said shaft, and two tool blocks pivoted in the said slots on the said shaft and its eccentric respectively, and bearing against the housing in opposite directions, said tool blocks being provided with means for holding cutting tools in position.

3. In a tool holder, the combination, with a housing provided with slots having openings at its opposite faces, one of the said slots being deeper than the other and the said housing being provided with means for securing it to the tool head of a planing machine in place of the usual tool apron, of two tool blocks pivoted on the same axis in the said slots and bearing against the housing in opposite directions, said tool blocks being provided with inclined holes for the cutting tools arranged crosswise of each other.

In testimony whereof I have affixed my signature in the presence of two witnesses.

FREDERICK SEITZ.

Witnesses:
FRANK J. HAACK,
FRED. WELLER.

---

Copies of this patent may be obtained for five cents each, by addressing the "Commissioner of Patents, Washington, D. C."